2 Sheets—Sheet 1.

G. W. BROWN.

SEED-PLANTER.

No. 6,757. Reissued Nov. 23, 1875.

Witnesses:

A. McCallum

J. Knight

Inventor:

Geo. W. Brown,

By W. B. Richards,

Atty.

N. PETERS, PHOTO-LITHOGRAPHER, WASHINGTON, D. C.

G. W. BROWN.

SEED-PLANTER.

No. 6,757.

Reissued Nov. 23, 1875.

Witnesses:

A. McCallum

Jos. Knight

Inventor:

Geo. W. Brown,

By W. B. Richards,

Atty.

N. PETERS, PHOTO-LITHOGRAPHER, WASHINGTON, D. C.

UNITED STATES PATENT OFFICE.

GEORGE W. BROWN, OF GALESBURG, ILLINOIS.

IMPROVEMENT IN SEED-PLANTERS.

Specification forming part of Letters Patent No. 99,286, dated February 1, 1870; reissue No. 6,757, dated November 23, 1875; application filed January 2, 1875.

DIVISION C.

*To all whom it may concern:*

Be it known that I, GEORGE W. BROWN, of Galesburg, county of Knox and State of Illinois, have invented a new and valuable Improvement in Seed-Planters; and I do hereby declare that the following is a full, clear, and exact description of the construction and operation of the same, reference being had to the annexed drawings, making a part of this specification, and to the letters and figures of reference marked thereon.

Figure 1:
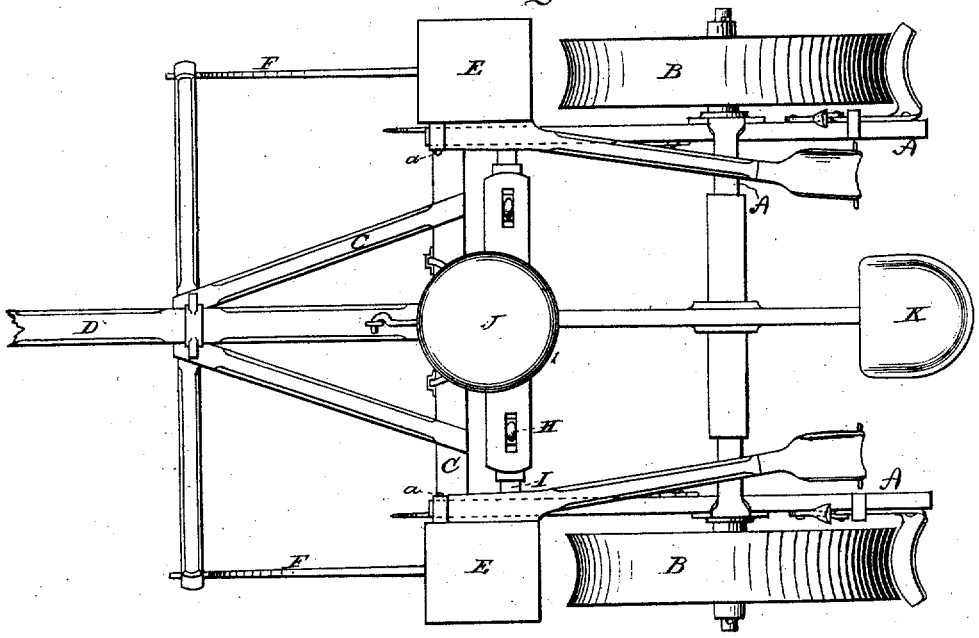
Figure 2:
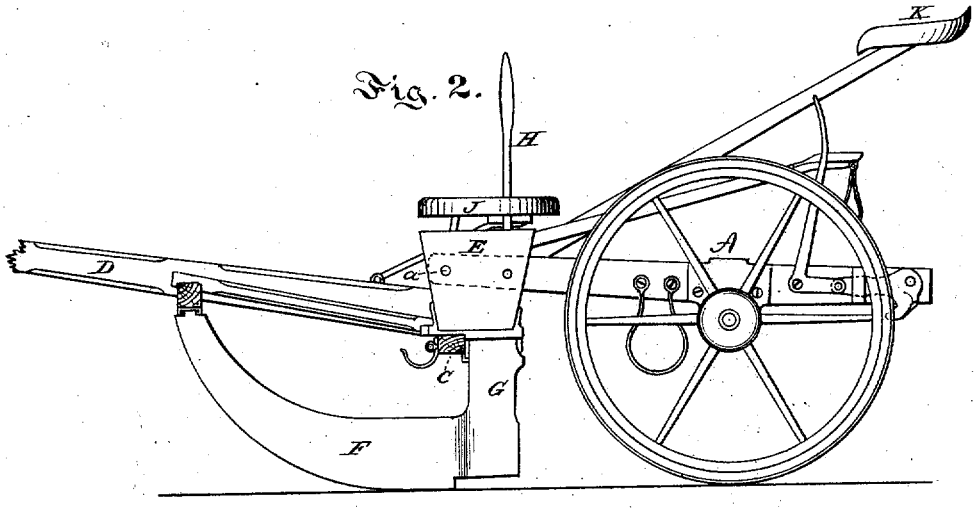
Figure 3:
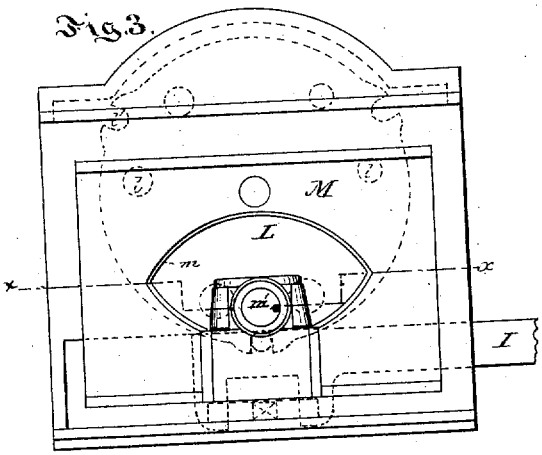
Figure 6:
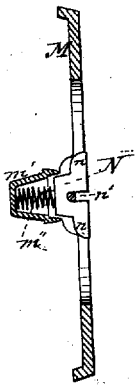
Figure 4:
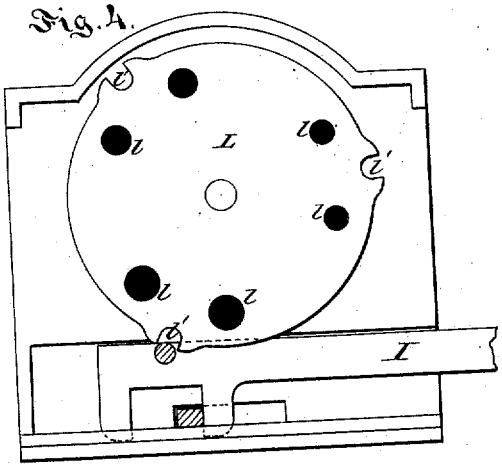
Figure 7:
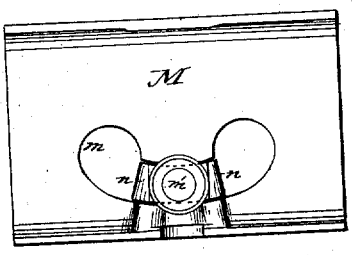
Figure 5:
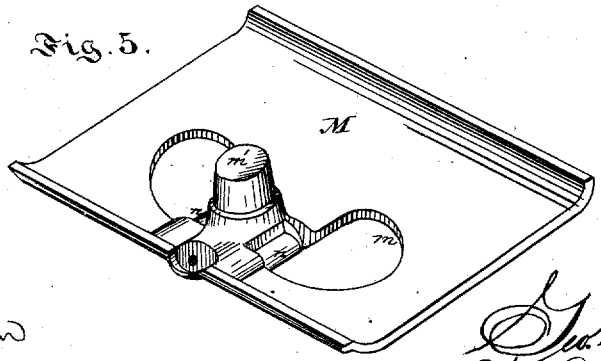

Figure 1 is a top view of a machine embodying my invention. Fig. 2 is a side elevation. Fig. 3 is a top view of the bottom of the seed-hopper. Fig. 4 is the same view as Fig. 3, except that the cap for the seed-cup plate is removed. Fig. 5 is a perspective view of the cap-plate for the seed-cup plate. Fig. 6 is a sectional view of Fig. 3 on the line *x x*. Fig. 7 is a top view of Fig. 5.

This invention has relation to that class of corn-planters in which the seed cups or chambers pass beneath cut-offs, for the purpose of separating the charge of seed from its fellows in the seed-hopper for delivery to the seed tube or conductor to the place of deposit in the soil; and the invention consists in the arrangement of a spiral spring with the cut-off, to render it yielding, and at same time allow it to oscillate slightly, so as not to injure the grain, all as hereinafter fully described. This invention is designed to be an improvement upon the various seed-planters which I have made heretofore, and for which I have several patents.

Letters A represent the parts of the rear main frame supported on wheels B B. Letters C represent the forward frame hinged to the rear frame A at *a*, and carrying the tongue D and hoppers E E, and runners or furrow-openers F F, and seed-tubes G. H is the hand-lever, by which the attendant gives the necessary reciprocating motion to the connecting-rod I to operate the seed-cup plates. J is the attendant's seat, and K is the driver's seat. L is the seed-cup plate, having three pairs of seed-cups, *l l*, each pair of different capacity, and may be adjusted or attached in position to drop through either pair of seed-chambers *l l*. It is given the necessary vibrating motion by a projection from the rod I, which engages with one of the recesses *l'* in its outer edge. M is a cap entirely covering the seed-cup plate, except an arc-shaped aperture, *m*, over the path of the seed-cups when vibrating. Centrally over the opening *m* is an arch or cap, *m'*, hollow from its under side. N is the cut-off, having two ends, *n n*, adapted to the approach of the seed-cups from each side or direction, and has also a projection extending slightly upward into the cap *m'*, over which a spiral spring, *m''*, is placed, so as to exert a continual downward pressure of the desired force on the cut-off. (See Fig. 6.) *n'* is a pin extending across the opening *m*, and rests in a transverse slot across the center and bottom of the cut-off M, so as not to interfere with its movements, but to prevent displacement of the spring and cut-off, and permit of its oscillating slightly.

It will be evident to any one skilled in the art that either end *n n* of the cut-off may oscillate or yield upward, to allow of seed-cups with upwardly-projecting grains passing under without cutting or damaging the seed, and without extra labor by the operator of the dropping mechanism. In case a seed-cup plate is used in which the approach of the cups to the cut-off is always in one direction; then it is obvious that one end of my cut-off may be dispensed with, and the spring applied to operate upon one end only. Rubber springs may be used instead of the spirals, if preferred.

What I claim as new is—

In a seed-planting machine, the combination of a seed-cup plate, through which the seed passes, with a spring cut-off having an oscillating as well as yielding movement, substantially as and for the purpose set forth.

GEORGE W. BROWN.

Witnesses:

M. D. HEBBERD,

J. J. TUNNICLIFF.